United States Patent
Wang et al.

(10) Patent No.: US 10,934,830 B2
(45) Date of Patent: Mar. 2, 2021

(54) DOWNHOLE GAS SEPARATORS AND METHODS OF SEPARATING A GAS FROM A LIQUID WITHIN A HYDROCARBON WELL

(71) Applicant: ExxonMobil Upstream Research Company, Spring, TX (US)

(72) Inventors: Jason Y. Wang, Spring, TX (US); Andrey A. Troshko, Spring, TX (US); Scott R. Buechler, Spring, TX (US); Michael C. Romer, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 16/564,231

(22) Filed: Sep. 9, 2019

(65) Prior Publication Data

US 2020/0003041 A1    Jan. 2, 2020

Related U.S. Application Data

(63) Continuation of application No. 15/245,858, filed on Aug. 24, 2016, now Pat. No. 10,450,848.

(60) Provisional application No. 62/254,355, filed on Nov. 12, 2015.

(51) Int. Cl.
*E21B 43/38* (2006.01)
*B01D 19/00* (2006.01)
*E21B 43/12* (2006.01)
*E21B 4/04* (2006.01)

(52) U.S. Cl.
CPC .......... *E21B 43/38* (2013.01); *B01D 19/0042* (2013.01); *B01D 19/0063* (2013.01); *E21B 4/04* (2013.01); *E21B 43/121* (2013.01); *E21B 43/126* (2013.01); *E21B 43/128* (2013.01); *C10G 2300/1033* (2013.01); *E21B 2200/05* (2020.05)

(58) Field of Classification Search
CPC .... E21B 2034/005; E21B 4/04; E21B 43/121; E21B 43/126; E21B 43/128; E21B 43/38; E21B 2200/05; B01D 19/0042; B01D 19/0063; C10G 2300/1033; C10G 7/02
See application file for complete search history.

(56) References Cited

U.S. PATENT DOCUMENTS

| 3,333,638 A * | 8/1967 | Bishop ................. E21B 43/124 166/306 |
| 5,443,120 A * | 8/1995 | Howell ................. E21B 43/385 166/265 |
| 6,554,066 B2 | 4/2003 | Lopes et al. |

(Continued)

*Primary Examiner* — Christopher J Sebesta
(74) *Attorney, Agent, or Firm* — ExxonMobil Upstream Research Company—Law Department

(57) ABSTRACT

Downhole gas separators, artificial lift systems including the downhole gas separators, hydrocarbon wells including the artificial lift systems, and methods of separating a gas from a liquid hydrocarbon within a hydrocarbon well. The downhole gas separators include an elongate outer housing that defines an enclosed volume, a fluid inlet port, and a gas outlet port. The downhole gas separators further include an elongate dip tube that extends within the enclosed volume, and the gas outlet port is configured to selectively provide fluid communication between the enclosed volume and an external region.

7 Claims, 6 Drawing Sheets

(56) References Cited

U.S. PATENT DOCUMENTS

| | | | |
|---|---|---|---|
| 7,604,464 B2 | 10/2009 | Williams | |
| 7,861,790 B2 | 1/2011 | Lembcke et al. | |
| 8,196,657 B2 | 6/2012 | Kennedy | |
| 8,863,849 B2 | 10/2014 | Patel | |
| 2004/0020638 A1* | 2/2004 | Williams | E21B 43/126 |
| | | | 166/68.5 |
| 2007/0181312 A1* | 8/2007 | Kritzler | E21B 43/123 |
| | | | 166/372 |
| 2013/0068455 A1 | 3/2013 | Brown et al. | |
| 2013/0068476 A1* | 3/2013 | Edwards | E21B 34/102 |
| | | | 166/373 |
| 2014/0260993 A1* | 9/2014 | Elms | E21B 21/067 |
| | | | 96/397 |
| 2015/0000982 A1 | 1/2015 | McDowell et al. | |
| 2017/0044888 A1* | 2/2017 | Bommer | E21B 43/12 |

* cited by examiner

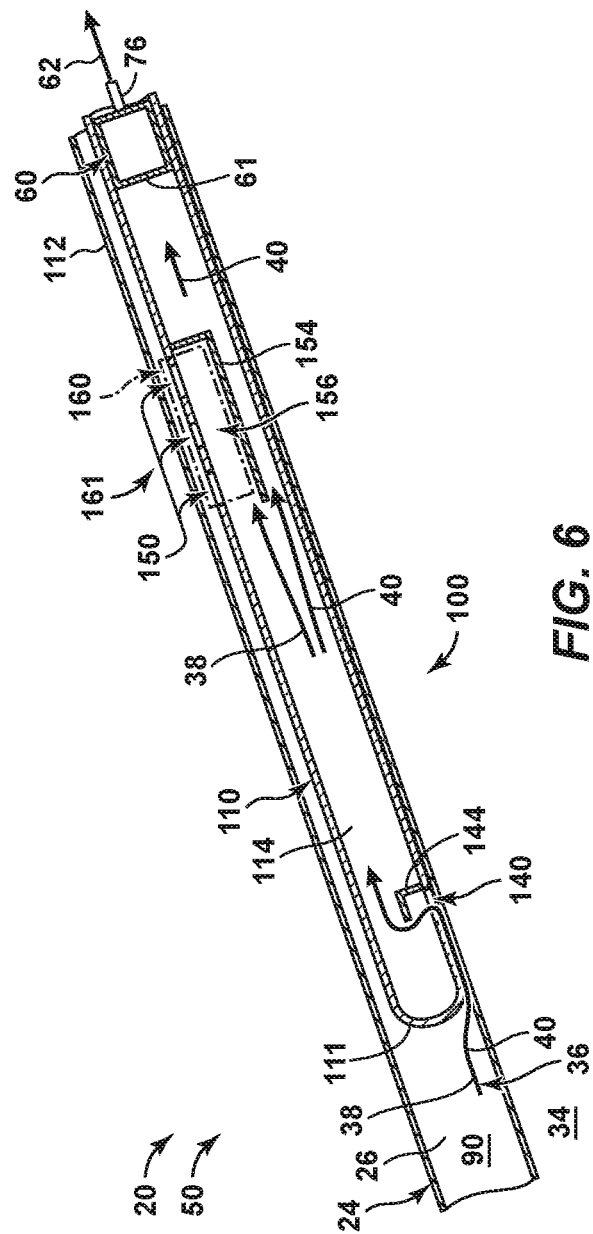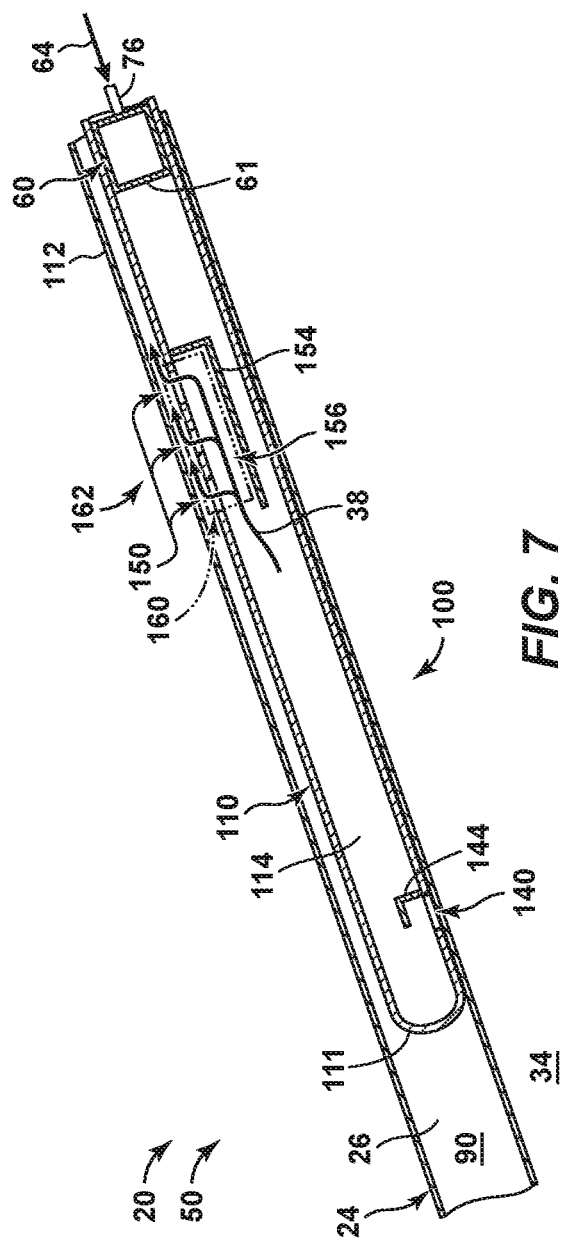

DOWNHOLE GAS SEPARATORS AND METHODS OF SEPARATING A GAS FROM A LIQUID WITHIN A HYDROCARBON WELL

CROSS REFERENCE TO RELATED APPLICATIONS

This application is a continuation of U.S. patent application Ser. No. 15/245,858. filed Aug. 24, 2016. entitled, "Downhole Gas Separators And Methods Of Separating A Gas From A Liquid Within A Hydrocarbon Well," which claims the benefit of U.S. Provisional Application No. 62/254,355 filed Nov. 12, 2015, entitled, "Downhole Gas Separators and Methods of Separating a Gas from a Liquid Hydrocarbon Well, " the disclosure of which are incorporated herein by reference in its entirety. This application is related to U.S. Provisional Application No. 62/254,358 filed Nov. 12, 2015, entitled, "Horizontal Well Production Apparatus and Method for Using the Same," the disclosure of which is incorporated herein by reference in its entirety.

FIELD OF THE DISCLOSURE

The present disclosure is directed generally to downhole gas separators, to artificial lift systems that include the downhole gas separators, to hydrocarbon wells that include the artificial lift systems, and/or to methods of separating a gas from a liquid hydrocarbon within a hydrocarbon well.

BACKGROUND OF THE DISCLOSURE

An artificial lift system may be utilized to provide a motive force for production of liquid hydrocarbons from a hydrocarbon well that extends within a subterranean formation. Such artificial lift systems often utilize a reciprocating pump, such as a rod pump, to pump the liquid hydrocarbons from the subterranean formation.

Gasses also may be present within the subterranean formation, and entry of the gasses into the reciprocating pump may decrease an operational efficiency of the artificial lift system. In extreme situations, these gasses may cause the reciprocating pump to become ineffective. This decrease in operational efficiency may be mitigated by utilizing a downhole gas separator to separate the gasses from the liquid hydrocarbon prior to entry of the liquid hydrocarbon into the reciprocating pump, thereby restricting entry of the gasses into the reciprocating pump.

Improving a separation efficiency of the downhole gas separator may improve the overall operational efficiency of the artificial lift system and/or may provide additional design flexibility to a designer and/or operator of the artificial lift system. Need exists for improved downhole gas separators and/or for improved methods of separating gas from liquid within a hydrocarbon well.

SUMMARY OF THE DISCLOSURE

Downhole gas separators, artificial lift systems including the downhole gas separators, hydrocarbon wells including the artificial lift systems, and methods of separating a gas from a liquid hydrocarbon within a hydrocarbon well are disclosed herein. The downhole gas separators include an elongate outer housing that defines an enclosed volume, a fluid inlet port, and a gas outlet port.

In a first embodiment, the downhole gas separators further include an elongate dip tube that extends within the enclosed volume. In this embodiment, the gas outlet port is configured to selectively provide fluid communication between the enclosed volume and an external region, and the gas outlet port is proximal a first housing end of the elongate outer housing relative to the fluid inlet port. In a second embodiment, the downhole gas separators further include a flow-regulating device that is configured to restrict fluid flow through the gas outlet during at least a portion of each intake stroke of a reciprocating pump and to permit the fluid flow during at least a portion of each exhaust stroke of the reciprocating pump.

The artificial lift systems include the reciprocating pump, a drive assembly for the reciprocating pump, and the downhole gas separator. The hydrocarbon wells include the artificial lift systems. The methods include methods of separating a gas from a liquid hydrocarbon, within a hydrocarbon well, utilizing the artificial lift systems.

BRIEF DESCRIPTION OF THE DRAWINGS

FIG. 6 is a less schematic cross-sectional view of an example of a portion of an artificial lift system including a downhole gas separator, according to the present disclosure, and a reciprocating pump.

FIG. 7 is a less schematic cross-sectional view of an example of a portion of an artificial lift system including a downhole gas separator, according to the present disclosure, and a reciprocating pump.

DETAILED DESCRIPTION AND BEST MODE OF THE DISCLOSURE

Figure 1:
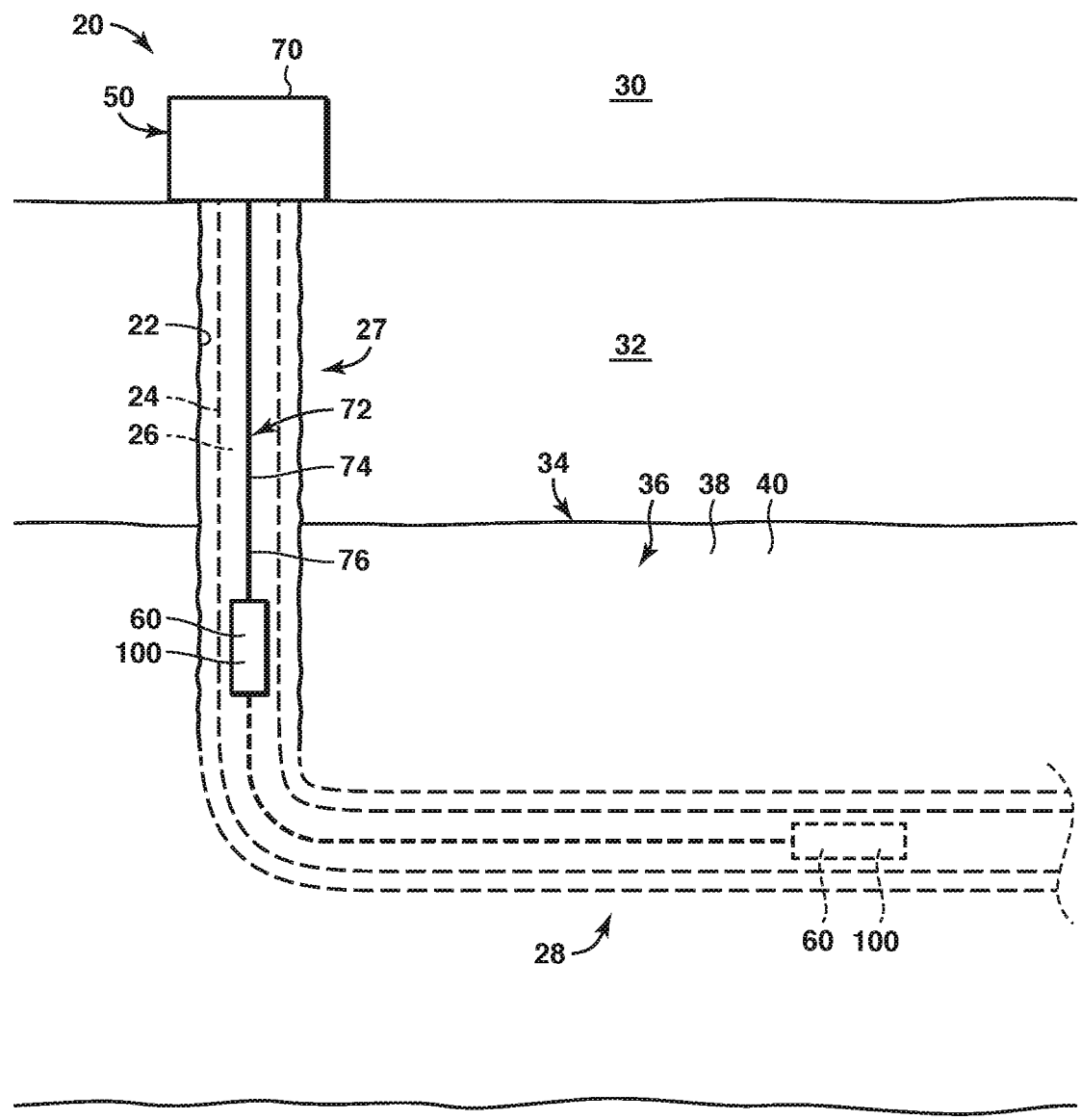
FIG. 1 is a schematic representation of examples of a hydrocarbon well that may include and/or utilize downhole gas separators and artificial lift systems according to the present disclosure.

FIGS. 1-11 provide examples of downhole gas separators 100 according to the present disclosure, of artificial lift systems 50 that include the downhole gas separators, of hydrocarbon wells 20 that include the artificial lift systems, and/or of methods of separating a gas from a liquid hydrocarbon, within a hydrocarbon well, utilizing the artificial lift systems. Elements that serve a similar, or at least substantially similar, purpose are labeled with like numbers in each of FIGS. 1-11, and these elements may not be discussed in detail herein with reference to each of FIGS. 1-11. Similarly, all elements may not be labeled in each of FIGS. 1-11, but reference numerals associated therewith may be utilized herein for consistency. Elements, components, and/or features that are discussed herein with reference to one or more of FIGS. 1-11 may be included in and/or utilized with any of FIGS. 1-11 without departing from the scope of the present disclosure.

In general, elements that are likely to be included are illustrated in solid lines, while elements that are optional are illustrated in dashed lines. However, elements that are shown in solid lines may not be essential. Thus, an element shown in solid lines may be omitted without departing from the scope of the present disclosure.

FIG. 1 is a schematic representation of examples of a hydrocarbon well 20 that may include and/or utilize downhole gas separators 100 according to the present disclosure. Hydrocarbon well 20 includes a wellbore 22 that extends from a surface region 30, that extends within a subsurface region 32, and/or that extends within a subterranean formation 34 of the subsurface region. Subterranean formation 34 includes a reservoir fluid 36 that includes a gas 38 and a liquid hydrocarbon 40.

Hydrocarbon well 20 further includes an artificial lift system 50 that is present, oriented, placed, and/or located within wellbore 22. Artificial lift system 50 may include and/or utilize a reciprocating pump 60 and downhole gas separator 100. Artificial lift system 50 further may include and/or utilize a drive assembly 70 for reciprocating pump 60, and a linkage 72 may interconnect the reciprocating pump with the drive assembly. Linkage 72 may include a liquid tubular 74, which may be configured to convey the liquid hydrocarbon from reciprocating pump 60 and/or to surface region 30, and/or a drive linkage 76, which may be configured to operatively interconnect drive assembly 70 with reciprocating pump 60. This may permit drive assembly 70 to power and/or to provide a motive force to reciprocating pump 60.

As illustrated in dashed lines in FIG. 1, hydrocarbon well 20 also may include a casing string 24 that defines a casing conduit 26. Casing string 24 may extend within wellbore 22, and at least a portion of artificial lift system 50 may be present, oriented, placed, and/or located within the casing conduit.

As also illustrated in FIG. 1, downhole gas separators 100, according to the present disclosure, may be utilized in vertical portions 27 of wellbore 22, as illustrated in solid lines. Additionally or alternatively, downhole gas separators 100, according to the present disclosure, also may be utilized in horizontal and/or deviated portions 28 of wellbore 22, as illustrated in dashed lines in FIG. 1.

Examples of downhole gas separator 100 are discussed in more detail herein with reference to downhole gas separators 100 of FIGS. 2-11, and any of the structures, features, and/or functions that are discussed herein with reference to hydrocarbon wells 20, artificial lift systems 50, and/or downhole gas separator 100 of FIG. 1 may be included in and/or utilized with downhole gas separators 100 of FIGS. 2-11 without departing from the scope of the present disclosure. Similarly, any of the downhole gas separators 100 of any of FIGS. 2-11 may be included in and/or utilized with hydrocarbon well 20 and/or artificial lift system 50 of FIG. 1 without departing from the scope of the present disclosure.

Examples of reciprocating pump 60 include a rod pump and/or a sucker rod pump. Examples of liquid tubular 74 include any suitable tubing and/or pipe that may form and/or define a liquid conduit suitable for conveying the liquid hydrocarbon from the reciprocating pump. Examples of drive linkage 76 include a mechanical linkage, a rigid rod, and/or a metallic rod. Examples of drive assembly 70 include an electric motor, an internal combustion engine, a hydraulic pump, and/or a hydraulic motor.

Figure 2:
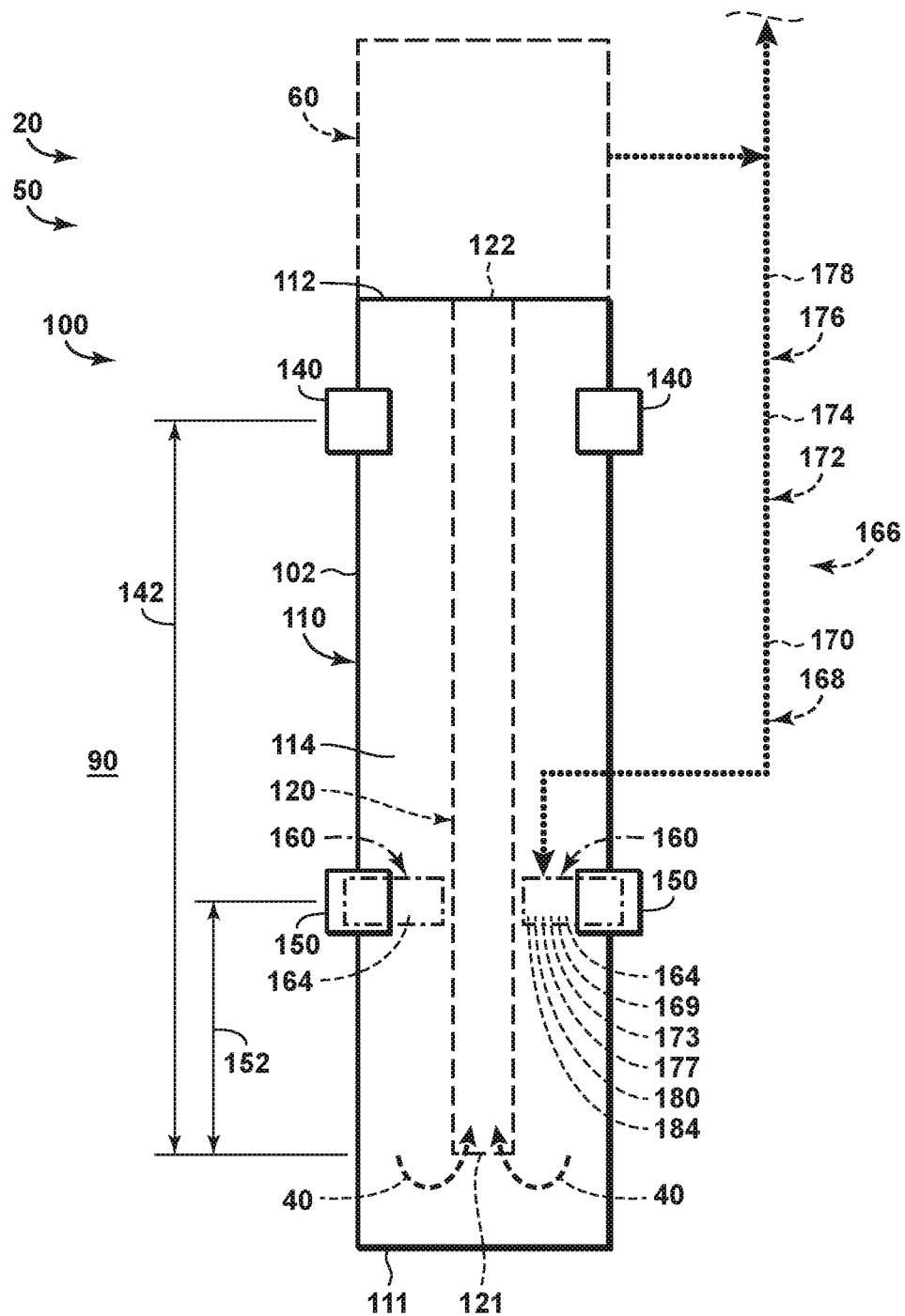
FIG. 2 is a schematic representation of examples of a downhole gas separator, according to the present disclosure.
Figure 3:
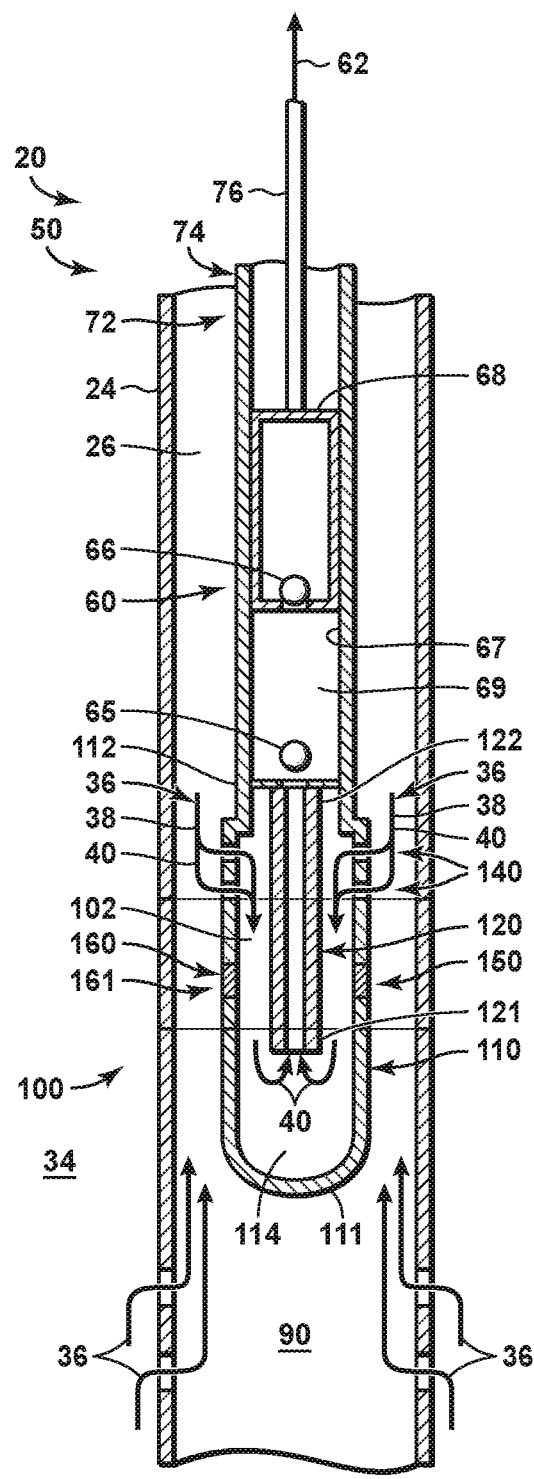
FIG. 3 is a less schematic cross-sectional view of an example of a portion of an artificial lift system including a downhole gas separator, according to the present disclosure, and a reciprocating pump.
Figure 4:
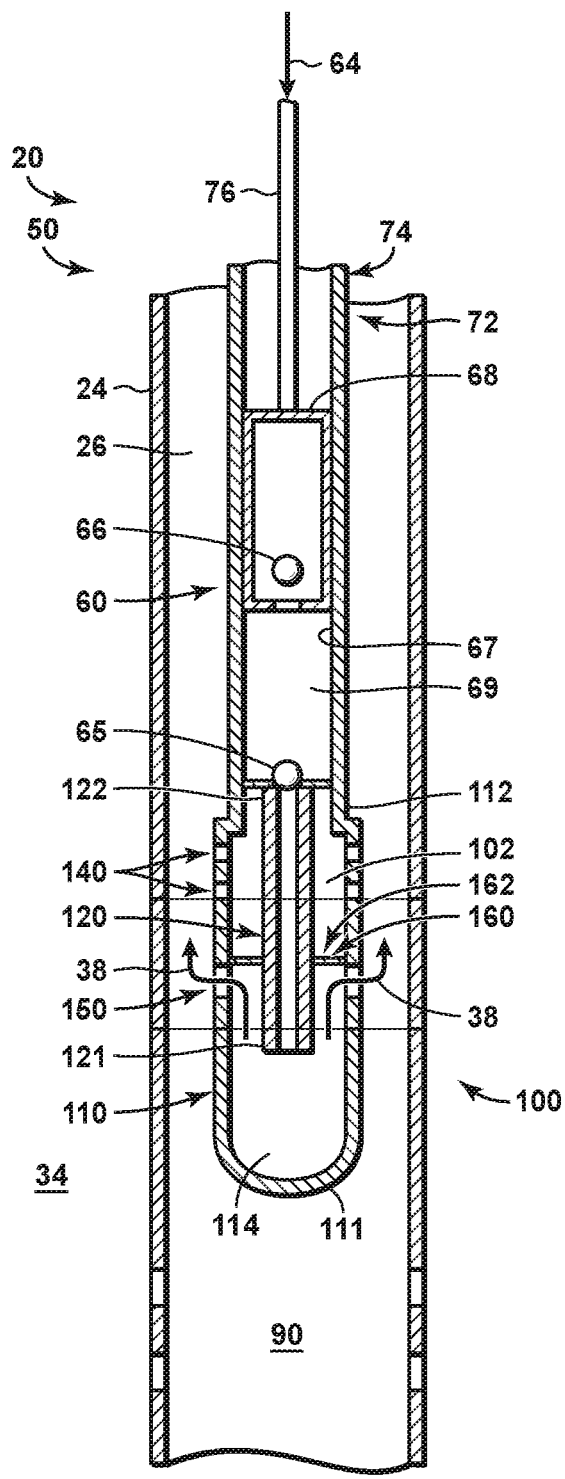
FIG. 4 is a less schematic cross-sectional view of an example of a portion of an artificial lift system including a downhole gas separator, according to the present disclosure, and a reciprocating pump.

FIG. 2 is a schematic representation of examples of a downhole gas separator 100, according to the present disclosure, while FIGS. 3-4 are less schematic cross-sectional views of an example of a portion of an artificial lift system 50 including a downhole gas separator 100, according to the present disclosure, and a reciprocating pump 60. FIG. 3 illustrates artificial lift system 50 during an intake stroke 62 of reciprocating pump 60, while FIG. 4 illustrates artificial lift system 50 during an exhaust stroke 64 of the reciprocating pump. Reciprocating pump 60 may be configured to repeatedly, periodically, and/or sequentially perform the intake stroke and the subsequent exhaust stroke. Downhole gas separator 100 of FIGS. 2-4 generally may be configured for operation in a vertical, or at least substantially vertical, wellbore, such as vertical portion 27 of wellbore 22 of FIG. 1. However, this is not required of all embodiments.

Downhole gas separator 100 also may be referred to herein as a gas separator 100 and/or as a separator 100. Artificial lift system 50 also may be referred to herein as a lift system 50, and/or as a system 50. Reciprocating pump 60 also may be referred to herein as a pump 60.

As illustrated in FIGS. 2-4, separator 100 includes an elongate outer housing 110 that includes an enclosed first housing end region 111 and a second housing end region 112 that is spaced-apart from the first housing end region. Outer housing 110 at least partially defines an enclosed volume 114, and second housing end region 112 is configured to operatively couple separator 100 to pump 60.

Separator 100 also includes a fluid inlet port 140 and a gas outlet port 150. Fluid inlet port 140 and gas outlet port 150 may be defined by or otherwise formed in outer housing 110. Fluid inlet port 140 extends through outer housing 110 and is configured to provide fluid communication between enclosed volume 114 and an external region 90 that is external to enclosed volume 114. Examples of external region 90 include a casing conduit 26 of a casing string 24 that extends within a subterranean formation 34, as illustrated in FIGS. 3-4.

Gas outlet port 150 extends through outer housing 110 and is configured to selectively provide fluid communication between enclosed volume 114 and external region 90. In addition, gas outlet port 150 is proximal first housing end region 111 relative to fluid inlet port 140 and/or is present within a region of outer housing 110 that is closer to first housing end region 111 than a region of outer housing 110 that includes fluid inlet port 140.

Gas outlet port 150 may provide the selective fluid communication between enclosed volume 114 and external region 90 in any suitable manner. As an example, and as illustrated in dashed-dot lines in FIG. 2 and in solid lines in FIGS. 3-4, gas outlet port 150 may include a flow-regulating device 160. Flow-regulating device 160 may be configured to selectively regulate fluid flow through the gas outlet port and also to selectively regulate fluid flow within a separator annulus 102, which is discussed in more detail herein. As such, FIG. 2 illustrates flow-regulating device 160 in dash-dot lines to indicate that the flow-regulating device may be configured to regulate, block, restrict, and/or occlude fluid flow within, or through, gas outlet port 150 and/or to regulate block, restrict, and/or occlude fluid flow within, or though, separator annulus 102. FIG. 3 illustrates flow-regulating device 160 in a first orientation 161, in which the flow-regulating device restricts fluid flow through gas outlet port 150 and permits fluid flow through separator annulus 102. FIG. 4 illustrates flow-regulating device 160 in a second orientation 162, in which the flow-regulating device restricts fluid flow within separator annulus 102 and permits fluid flow through gas outlet 150.

As also illustrated in dashed lines in FIG. 2 and in solid lines in FIGS. 3-4, separator 100 may include an elongate dip tube 120 that has a first tube end 121 and a second tube end 122. Dip tube 120 extends within enclosed volume 114 that is defined by outer housing 110 and defines separator annulus 102 between the dip tube and the outer housing. In addition, first tube end 121 is proximal first housing end region 111 (relative to second tube end 122) and/or is configured to receive a fluid, such as liquid hydrocarbon 40, from enclosed volume 114. Second tube end 122 is proximal second housing end 112 (relative to first tube end 121) and/or is configured to provide the fluid, such as liquid hydrocarbon 40, to reciprocating pump 60.

During operation of hydrocarbon wells 20 with artificial lift systems 50 that utilize separators 100 of FIGS. 2-4, reciprocating pump 60 may be powered and/or otherwise actuated, such as via drive assembly 70 of FIG. 1 and/or via drive linkage 76, to provide artificial lift to a reservoir fluid 36 that may be present within subterranean formation 34, as illustrated in FIGS. 1 and 3. In the systems and methods disclosed herein, this actuation of the reciprocating pump may be referred to as powering the reciprocating pump. The reservoir fluid may include a gas 38 and a liquid hydrocarbon 40, and separators 100 may be configured to limit, restrict, and/or block flow of the gas into the reciprocating pump while permitting flow of the liquid hydrocarbon into the reciprocating pump. The artificial lift may provide a motive force for production of at least a portion of the reservoir fluid from the subterranean formation, which may be referred to herein as producing a fluid, such as liquid hydrocarbon 40, from the subterranean formation.

As illustrated in FIG. 3, reciprocating pump 60 may perform intake stroke 62. During the intake stroke, the reciprocating pump may draw liquid hydrocarbon 40 into first tube end 121 of dip tube 120. This flow of liquid hydrocarbon 40 into first tube end 121 may cause, or provide a motive force for, a corresponding flow of reservoir fluid 36 from external region 90 and into separator annulus 102 via one or more fluid inlet ports 140.

During intake stroke 62, and as illustrated in FIG. 3, gas outlet port 150 and/or flow-regulating device 160 thereof may be in first orientation 161. Thus, fluid flow through gas outlet port 150 is restricted. However, fluid flow within and/or along separator annulus 102 is permitted, thereby permitting reservoir fluid 36 that enters separator annulus 102 to flow, along the separator annulus, toward and/or into first tube end 121. In the systems and methods disclosed herein, this may be referred to as restricting fluid flow through the gas outlet port while permitting fluid flow through the separator annulus.

As discussed, reservoir fluid 36 may include gas 38 and liquid hydrocarbon 40, and a density difference between the gas and the liquid hydrocarbon may cause the gas and the liquid hydrocarbon to at least partially separate from one another within separator annulus 102. More specifically, a buoyant force on gas 38 (or bubbles of gas 38 that may be dispersed within liquid hydrocarbon 40) may cause gas 38 to flow along separator annulus 102 more slowly than liquid hydrocarbon 40, thereby increasing a time required for gas 38 to flow from fluid inlet port 140 to first tube end 121 when compared to a time required for the liquid hydrocarbon 40 to flow from the fluid inlet port to the first tube end.

Thus, through appropriate selection of a geometry of separator 100, such as a vertical distance between gas inlet ports 140 and first tube end 121, a cross-sectional area of separator annulus 102, and/or a cross-sectional area of fluid inlet ports 140, separator 100 may be configured such that gas 38, or at least a majority of gas 38, does not reach first tube end 121 during a given intake stroke 62 of reciprocating pump 60. The specific geometry of separator 100 may be based upon a variety of factors, including a volume of fluid displaced by the given intake stroke of reciprocating pump 60, a flow rate of reservoir fluid 36 through fluid inlet ports 140 that is produced by the given intake stroke of reciprocating pump 60, a viscosity of reservoir fluid 36, a viscosity of gas 38, a viscosity of liquid hydrocarbon 40, a density of gas 38, a density of liquid hydrocarbon 40, and/or a density difference between gas 38 and liquid hydrocarbon 40. As such, the specific geometry of separator 100 may be selected and/or specified for a given application.

Subsequently, and as illustrated in FIG. 4, reciprocating pump 60 may perform exhaust stroke 64. During the exhaust stroke, the reciprocating pump may not draw liquid hydrocarbon 40 into first tube end 121 of elongate dip tube 120 and/or reciprocating pump 60 may not provide a motive force for fluid flow within enclosed volume 114. Thus, liquid hydrocarbon 40 may not flow, may not experience significant flow, and/or may be relatively quiescent within enclosed volume 114, at least when compared to the flow of liquid hydrocarbon 40 during intake stroke 62 of FIG. 3. However, the buoyant force acting on gas 38 still may cause the gas to rise within the liquid hydrocarbon and/or may cause the gas to flow upward.

During exhaust stroke 64, and as illustrated in FIG. 4, gas outlet port 150 and/or flow-regulating device 160 thereof may be in second orientation 162. Thus, fluid flow through gas outlet port 150 is permitted. However, fluid flow within and/or along separator annulus 102 is restricted. It follows then that gas 38 present within internal volume 114 at a location that is vertically below gas outlet port 150 may flow along separator annulus 102, through gas outlet port 150, and into external region 90, and this gas may be at least partially directed to and/or toward the gas outlet port by flow-regulating device 160. In the systems and methods disclosed herein, this may be referred to as permitting fluid flow through the gas outlet port while restricting fluid flow through the separator annulus.

Conventional downhole gas separators may be similar to separator 100 of FIGS. 2-4 but may not include gas outlet port 150 and/or flow-regulating device 160 thereof. As such, and in order for a gas to exit the separator annulus of such conventional downhole gas separators, the gas must flow along a much longer portion of the separator annulus, thereby decreasing a potential for the gas to exit the separator annulus prior to initiation of the next intake stroke of the reciprocating pump and/or requiring a correspondingly lower flow rate of fluid within the separator annulus, during the intake stroke, to provide a comparable level of separation between the gas and the liquid hydrocarbon. In addition, the selective nature of gas outlet port 150 and/or flow-regulating device 160 in separators 100 according to the present disclosure restricts fluid flow into gas outlet port 150 during the intake stroke of the reciprocating pump. Thus, separators 100 according to the present disclosure may provide a significantly shorter flow path for gas 38 to exit enclosed volume 114 while providing an equivalent flow path for reservoir fluid 36 to enter enclosed volume 114 and/or reach first tube end 121 when compared to conventional downhole gas separators, thereby increasing an operational efficiency of downhole gas separators 100, according to the present disclosure, when compared to the conventional downhole gas separators.

An example of this difference in fluid flow paths is illustrated in FIG. 2. As illustrated, separator 100 may have and/or define a fluid inlet port flow distance 142 and a gas outlet port flow distance 152. Fluid inlet port flow distance 142 may be measured within separator annulus 102 and between fluid inlet port 140 and first tube end 121 of elongate dip tube 120. Similarly, gas outlet port flow distance 152 may be measured within separator annulus 102 and between gas outlet port 150 and first tube end 121. In general, and as discussed, gas outlet port flow distance 152 of separator 100 is less than fluid inlet port flow distance 142. As examples, gas outlet port flow distance 152 may be less than 90%, less than 80%, less than 75%, less than 70%, less than 60%, less than 50%, less than 40%, less than 30%, or less than 25% of fluid inlet port flow distance 142.

Fluid inlet port 140 and gas outlet port 150 may be sized such that an inlet port resistance to fluid flow is less than an outlet port resistance to fluid flow. The inlet port resistance to fluid flow may be a resistance to fluid flow from external region 90, via fluid inlet port 140 and/or along separator annulus 102, to first tube end 121 of elongate dip tube 120. The outlet port resistance to fluid flow may be a resistance to fluid flow from external region 90, via gas outlet port 150 and/or along separator annulus 102, to first tube end 121 when gas outlet port 150 and/or flow-regulating device 160 thereof is in the first (i.e., open and/or flow-permitting) orientation.

As examples, the inlet port resistance to fluid flow may be less than 10%, less than 20%, less than 25%, less than 30%, less than 40%, less than 50%, less than 60%, less than 70%, less than 75%, less than 80%, less than 90%, or less than 95% of the outlet port resistance to fluid flow. The inlet port resistance to fluid flow may be quantified as a pressure drop between fluid inlet port 140 and first tube end 121 for a given flow rate of fluid through the fluid inlet port. Similarly, the outlet port resistance to fluid flow may be quantified as a pressure drop between gas outlet port 150 and first tube end 121 for the given flow rate of fluid through the gas outlet port.

It is within the scope of the present disclosure that separator 100 may include any suitable number of fluid inlet ports 140 and/or gas outlet ports 150 with any suitable geometry. As an example, and as illustrated in FIGS. 2-4, separator 100 may include a plurality of fluid inlet ports 140 and/or a plurality of gas outlet ports 150 that may be radially spaced-apart around a circumference, or around a transverse cross-section, of outer housing 110. As another example, and as illustrated in FIGS. 3-4 with respect to fluid inlet ports 140, separator 100 may include a plurality of fluid inlet ports 140 and/or a plurality of gas outlet ports 150 that may be longitudinally spaced-apart along a length of outer housing 110. As yet another example, fluid inlet ports 140 and/or gas outlet ports 150 may include and/or be arcuate ports that may extend around at least a threshold fraction of the transverse cross-section of outer housing 110. Examples of the threshold fraction of the transverse cross-section include threshold fractions of at least 10%, at least 20%, at least 30%, at least 40%, at least 50%, at least 60%, at least 70%, at least 80%, at least 90%, or at least 95% of the transverse cross-section.

As discussed, reciprocating pump 60 may be configured to repeatedly perform the intake stroke and the subsequent exhaust stroke. As also discussed, flow-regulating device 160 may be configured to restrict fluid flow through gas outlet port 150 and also to permit fluid flow through separator annulus 102 during the intake stroke. This may include automatically, repeatedly, periodically, and/or passively restricting the fluid flow through the gas outlet port while permitting the fluid flow through the separator annulus during at least a portion of each, or every, intake stroke of the reciprocating pump. As an example, and when in first orientation 161 of FIG. 3, flow-regulating device 160 may form a first fluid seal across and/or with gas outlet port 150.

Similarly, flow-regulating device 160 also may be configured to permit fluid flow through gas outlet port 150 and also to restrict fluid flow through separator annulus 102 during the exhaust stroke. This may include automatically, repeatedly, periodically, and/or passively permitting the fluid flow through the gas outlet while restricting the fluid flow through the separator annulus during at least a portion of each, or every, exhaust stroke of the reciprocating pump. As an example, and when in second orientation 162 of FIG. 4, flow-regulating device 160 may form a second fluid seal between outer housing 110 and dip tube 120. The second fluid seal may restrict, block, and/or occlude fluid flow within separator annulus 102 and between fluid inlet port 140 and gas outlet port 150. Additionally or alternatively, the second fluid seal may permit and/or facilitate fluid flow within separator annulus 102 and between first tube end 121 and gas outlet port 150.

Flow-regulating device 160 may be configured to transition between first orientation 161, as illustrated in FIG. 3, and second orientation 162, as illustrated in FIG. 4, in any suitable manner and/or responsive to any suitable signal, stimulus, and/or motive force. As an example, flow-regulating device 160 may include and/or be a passive flow-regulating device 160 that may be configured to automatically transition between the first orientation and the second orientation responsive to fluid flow within separator annulus 102.

As a more specific example, flow-regulating device 160 may be biased to the second orientation and may be configured to transition to the first orientation responsive to the fluid flow within the separator annulus. The bias may return the flow-regulating device to the second orientation and/or maintain the flow-regulating device in the second orientation, when there is no, or substantially no, fluid flow within the separator annulus, responsive to a lack of fluid flow within the separator annulus, and/or during at least a portion of the exhaust stroke of the reciprocating pump. Under these conditions, and as illustrated in FIG. 2, flow-regulating device 160 may include a biasing mechanism 164 that may be configured to provide the bias. Examples of biasing mechanism 164 include any suitable resilient material, elastomeric material, and/or spring.

As another example, flow-regulating device 160 may include and/or be an active flow-regulating device that may be configured to transition between the first orientation and the second orientation responsive to receipt of a transition signal 166. As a more specific example, flow-regulating device 160 may be biased to one of the first orientation and the second orientation, such as via biasing mechanism 164 of FIG. 2, and may be configured to transition to the other of the first orientation and the second orientation responsive to receipt of the transition signal. Under these conditions, the flow-regulating device may operate, against the bias, to transition to and/or to be retained within the other of the first orientation and the second orientation responsive to receipt of the transition signal. In addition, the bias may provide a motive force for return of the flow-regulating device to the one of the first orientation and the second orientation, such as when the transition signal is not provided to the flow-regulating device.

As another more specific example, the transition signal may include and/or be an electrical transition signal 170, as illustrated in FIG. 2. Under these conditions, separator 100 may include an electrical conduit 168 that may be configured to provide the electrical transition signal to flow-regulating device 160. In addition, flow-regulating device 160 may include an electrical actuator 169 that may be configured to receive the electrical transition signal and/or to transition the flow-regulating device between the first orientation and the second orientation responsive to receipt of the electrical transition signal.

As another more specific example, the transition signal may include and/or be a hydraulic transition signal 174, as illustrated in FIG. 2. Under these conditions, separator 100 may include a hydraulic conduit 172 that may be configured to provide the hydraulic transition signal to flow-regulating device 160. In addition, flow-regulating device 160 may include a hydraulic actuator 173 that may be configured to receive the hydraulic transition signal and/or to transition the flow-regulating device between the first orientation and the second orientation responsive to receipt of the hydraulic transition signal. The hydraulic transition signal may be generated in any suitable manner. As an example, hydraulic conduit 172 may provide fluid communication between flow-regulating device 160 and reciprocating pump 60, and the reciprocating pump may be configured to generate the hydraulic transition signal.

As yet another more specific example, the transition signal may include and/or be a mechanical transition signal 178, as illustrated in FIG. 2. Under these conditions, separator 100 may include a mechanical linkage 176 that may be configured to provide the mechanical transition signal to flow-regulating device 160. In addition, flow-regulating device 160 may include a mechanical actuator 177 that may be configured to receive the mechanical transition signal and/or to transition the flow-regulating device between the first orientation and the second orientation responsive to receipt of the mechanical transition signal. The mechanical transition signal may be generated in any suitable manner. As an example, mechanical linkage 176 may provide mechanical communication between flow-regulating device 160 and reciprocating pump 60, and the reciprocating pump may be configured to actuate the mechanical linkage to generate the mechanical transition signal.

Flow-regulating device 160 may include any suitable structure and/or may be formed from any suitable material and/or materials of construction. As an example, flow-regulating device 160 may include and/or be a flapper valve 180. As another example, flow-regulating device 160 may include and/or be a lip seal 184 that may extend around a circumference of separator annulus 102. As yet another example, flow-regulating device 160 may include a rigid portion, which may be formed from a rigid material. Examples of the rigid material include any suitable metal, steel, carbon steel, and/or stainless steel. As another example, flow-regulating device 160 may include a resilient portion, such as may be utilized to form the fluid seal. The resilient portion may be formed from a resilient material, examples of which include a polymeric material, an elastomeric material, a plastic, a rubber, and/or a hydrogenated nitrile rubber.

Reciprocating pump 60 may operate and/or perform intake stroke 62 and/or exhaust stroke 64 in any suitable manner. As an example, and as illustrated in FIGS. 3-4, reciprocating pump 60 may include a first check valve 65, a second check valve 66, a cylinder 67, and a plunger 68. During intake stroke 62 of reciprocating pump 60, and as illustrated in FIG. 3, drive linkage 76 may move plunger 68 in an upward direction. Motion of plunger 68 in the upward direction may cause first check valve 65 to open and second check valve 66 to close, thereby permitting the reciprocating pump to draw fluid thereinto and/or increasing a volume of liquid hydrocarbon 40 that is contained within a pumping region 69 of the reciprocating pump.

During the subsequent exhaust stroke, and as illustrated in FIG. 4, drive linkage 76 may move plunger 68 in a downward direction. Motion of plunger 68 in the downward direction may cause first check valve 65 to close and second check valve 66 to open, thereby permitting the reciprocating pump to draw fluid above second check valve 66 and concurrently decreasing the volume of liquid hydrocarbon 40 that is contained within pumping region 69 and/or discharging the liquid hydrocarbon from the pumping region.

Figure 5:
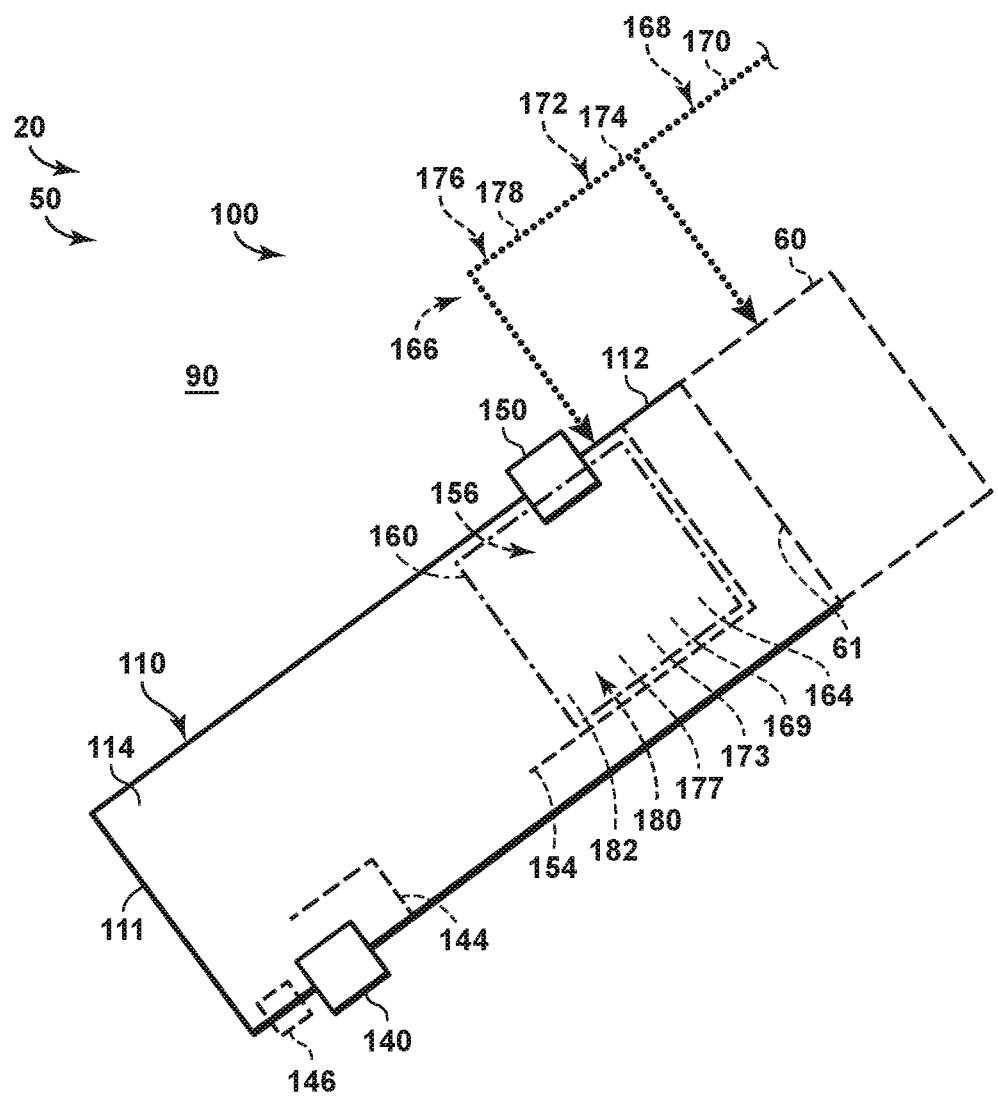
FIG. 5 is a schematic representation of an exemplary downhole gas separator.

FIG. 5 is a schematic representation of examples of a downhole gas separator 100, according to the present disclosure, while FIGS. 6-7 are less schematic cross-sectional views of an example of a portion of an artificial lift system 50 including a downhole gas separator 100, according to the present disclosure, and a reciprocating pump 60. FIG. 6 illustrates artificial lift system 50 during an intake stroke 62 of reciprocating pump 60, while FIG. 7 illustrates artificial lift system 50 during an exhaust stroke 64 of the reciprocating pump. Reciprocating pump 60 of FIGS. 5-7 may be at least substantially similar to reciprocating pump 60 of FIGS. 1-4, and any of the structures, functions, and/or features that are discussed herein with reference to any one of FIGS. 1-4 may be included in and/or utilized with downhole gas separators 100 of FIGS. 5-7 without departing from the scope of the present disclosure. Thus, and similar to reciprocating pumps 60 of FIGS. 1-4, reciprocating pumps 60 of FIGS. 5-7 may be configured to repeatedly, periodically, and/or sequentially perform the intake stroke and the subsequent exhaust stroke. Downhole gas separator 100 of FIGS. 5-7 generally may be configured for operation in horizontal and/or deviated wellbores, such as horizontal and/or deviated portion 28 of FIG. 1. However, this is not required of all embodiments.

As illustrated in FIGS. 5-7, separator 100 includes an elongate outer housing 110 that includes a first housing end region 111 and a second housing end region 112 that is spaced-apart from the first housing end region. Outer housing 110 at least partially defines an enclosed volume 114, and second housing end region 112 is configured to operatively couple separator 100 to pump 60, such as to provide fluid communication between a pump inlet 61 of the reciprocating pump and enclosed volume 114.

Separator 100 also includes a fluid inlet port 140 and a gas outlet port 150. Fluid inlet port 140 is defined within and/or extends through outer housing 110 and is configured to provide fluid communication between enclosed volume 114 and an external region 90 that is external to enclosed volume 114. Examples of external region 90 include a casing conduit 26 of a casing string 24 that extends within a subterranean formation 34, as illustrated in FIGS. 6-7. Gas outlet port 150 is defined within and/or extends through outer housing 110 and is configured to provide fluid communication between enclosed volume 114 and external region 90.

Separator 100 further includes a flow-regulating device 160. Flow-regulating device 160 is configured to selectively restrict fluid flow through gas outlet port 150 during at least a portion of each intake stroke 62 of reciprocating pump 60 (as illustrated by dash-dot lines FIG. 6). In addition, flow-regulating device 160 also is configured to permit fluid flow through gas outlet port 150 during at least a portion of each exhaust stroke 64 of reciprocating pump 60 (as illustrated by dash-dot-dot lines in FIG. 7).

Fluid inlet port 140 generally is proximal, or closer to, first housing end 111 relative to gas outlet port 150. Similarly, gas outlet port 150 generally is proximal, or closer to, second housing end 112 and/or reciprocating pump 60 relative to fluid inlet port 140. Stated another way, fluid inlet port 140 and gas outlet port 150 may be on, or proximal, opposed ends of elongate outer housing 110. In addition, separator 100 is configured to be oriented within wellbore 22 such that fluid inlet port 140 faces downward, or generally downward, and also such that gas outlet port 150 faces upward, or generally upward. Stated another way, fluid inlet port 140 and gas outlet port 150 may face away from one another and/or may face in opposed, or at least substantially opposed, directions. To facilitate this relative orientation of fluid inlet port 140 and gas outlet port 150, the fluid inlet port and/or first housing end region 111 may include a weight 146, as illustrated in FIG. 5. Under these conditions, fluid inlet port 140 also may be referred to herein as a weighted fluid inlet port 140.

As illustrated in dashed lines in FIG. 5 and in solid lines in FIGS. 6-7, separator 100 also may include an inlet weir 144 and/or an outlet weir 154. Inlet weir 144 may be proximal to and/or associated with fluid inlet port 140. In addition, and as illustrated, inlet weir 144 may extend within enclosed volume 114 and/or may be shaped and/or configured to provide a tortuous flow path for fluid entering enclosed volume 114 via the fluid inlet port. Additionally or alternatively, inlet weir 144 also may be shaped and/or configured to prevent channeling of the fluid within enclosed volume 114 and past outlet weir 154 and/or to pump inlet 61. Outlet weir 154 may be proximal to and/or associated with gas outlet port 150. In addition, and as illustrated, outlet weir 154 may extend within enclosed volume 114 and/or may be shaped and/or configured to separate gas 38 from liquid hydrocarbon 40 within the enclosed volume.

During operation of hydrocarbon wells 20 with artificial lift systems 50 that utilize separators 100 of FIGS. 5-7, reciprocating pump 60 may be powered and/or otherwise actuated, such as via drive assembly 70 of FIG. 1 and/or via drive linkage 76, to provide artificial lift to a reservoir fluid 36 that may be present within subterranean formation 34, as illustrated in FIGS. 1 and 6. In the systems and methods disclosed herein, this actuation of the reciprocating pump may be referred to as powering the reciprocating pump. The reservoir fluid may include a gas 38 and a liquid hydrocarbon 40, and separators 100 may be configured to limit, restrict, and/or block flow of the gas into the reciprocating pump while permitting flow of the liquid hydrocarbon into the reciprocating pump. The artificial lift may provide a motive force for production of at least a portion of the reservoir fluid from the subterranean formation, which may be referred to herein as producing a fluid, such as liquid hydrocarbon 40, from the subterranean formation.

As illustrated in FIG. 6, reciprocating pump 60 may perform intake stroke 62. During the intake stroke, the reciprocating pump may draw liquid hydrocarbon 40 into pump inlet 61 thereof. This flow of liquid hydrocarbon 40 into pump inlet 61 may cause, or provide a motive force for, a corresponding flow of reservoir fluid 36 from external region 90 and into enclosed volume 114 via fluid inlet port 140.

During intake stroke 62, and as indicated by dash-dot lines in FIG. 6, flow-regulating device 160 may be in a first orientation 161 in which fluid flow through gas outlet port 150 is restricted. As an example, and when in the first orientation, the flow-regulating device may form a fluid seal across the gas outlet port. As another example, and when in the first orientation, the flow-regulating device may fluidly isolate at least a portion of the enclosed volume from the external region.

However, while the flow-regulating device is in the first orientation, fluid flow between fluid inlet port 140 and pump inlet 61 still is permitted, thereby permitting reservoir fluid 36 that enters enclosed volume 114 to flow, within the enclosed volume, toward and/or into pump inlet 61. In the systems and methods disclosed herein, this may be referred to as restricting fluid flow through the gas outlet port, permitting fluid flow through the fluid inlet port, and/or permitting fluid flow between the fluid inlet port and the pump inlet to permit the liquid hydrocarbon to enter the reciprocating pump.

As discussed, reservoir fluid 36 may include gas 38 and liquid hydrocarbon 40, and a density difference between the gas and the liquid hydrocarbon may cause the gas and the liquid hydrocarbon to at least partially separate from one another within internal volume 114. More specifically, a buoyant force on gas 38 (or bubbles of gas 38 that may be dispersed within liquid hydrocarbon 40) may cause gas 38 to segregate vertically upward within internal volume 114 relative to liquid hydrocarbon 40.

Thus, gas 38, or at least a major fraction thereof, may be separated from liquid hydrocarbon 40 by outlet weir 154. More specifically, and while flow-regulating device 160 is in first orientation 161, the gas may be captured and/or retained within a gas retention region 156 that is at least partially defined and/or bounded by outlet weir 154. However, liquid hydrocarbon 40 may flow past, or below, the outlet weir, thereby permitting the liquid hydrocarbon to enter pump inlet 61.

Subsequently, and as illustrated in FIG. 7, reciprocating pump 60 may perform exhaust stroke 64. During the exhaust stroke, the reciprocating pump may not draw liquid hydrocarbon 40 into pump inlet 61 and/or reciprocating pump 60 may not provide a motive force for fluid flow within enclosed volume 114. Thus, liquid hydrocarbon 40 may not flow, may not experience significant flow, and/or may be relatively quiescent within enclosed volume 114, at least when compared to the flow of liquid hydrocarbon 40 during intake stroke 62 of FIG. 6. However, the buoyant force acting on gas 38 still may cause the gas to rise within the liquid hydrocarbon and/or may cause the gas to flow upward.

During exhaust stroke 64, and as illustrated in FIG. 7, flow-regulating device 160 may be in a second orientation 162 in which fluid flow through gas outlet port 150 is permitted. Therefore, gas 38 that may be present within internal volume 114 and/or within gas retention it) region 156 may flow through gas outlet port 150 and/or into external region 90. In the systems and methods disclosed herein, this may be referred to as permitting fluid flow through the gas outlet port.

Conventional downhole gas separators may be similar to separators 100 of FIGS. 5-7 but may not include flow-regulating device 160 thereof. As such, the gas outlet port of the conventional downhole gas separator always provides, or provides unrestricted and/or non-selective, fluid communication between the external region and the enclosed volume. In such a configuration, and during the intake stroke of the reciprocating pump, fluid may flow from the external region and into the enclosed volume, via the gas outlet port, thereby impeding flow of the gas toward the gas outlet port, disrupting the flow of the gas toward the gas outlet port, mixing the gas contained within the enclosed volume with the fluid that flows into the enclosed volume via the gas outlet port, and/or entraining the gas within the fluid that flows into the enclosed volume via the gas outlet port. Such a configuration decreases the overall separation efficiency of the conventional downhole gas separators when compared to gas separators 100 according to the present disclosure and/or restricts a total volume of fluid that may be pumped by a given intake stroke of the reciprocating pump for a given downhole gas separator geometry.

Flow-regulating device 160 may include any suitable structure. As an example, flow-regulating device 160 may include and/or be a flapper valve 180 that may include a flapper 182, as illustrated schematically in FIG. 5 and less schematically in FIGS. 8-11. Under these conditions, the flapper may be configured to selectively transition between a closed orientation, in which the flapper valve restricts the fluid flow through the gas outlet port (i.e., first orientation 161), and an open orientation, in which the flapper valve permits the fluid flow through the gas outlet port (i.e., second orientation 162). When in the closed orientation, flapper valve 180 may at least partially define enclosed volume 114.

Flow-regulating device 160 may selectively restrict and/or permit fluid flow through gas outlet port 150 in any suitable manner and/or may be located at any suitable location within downhole gas separator 100, and FIGS. 8-11 provide examples of suitable orientations and/or locations for flow-regulating devices 160 that include flapper valve 180. In FIGS. 8-11, the open orientation is illustrated in dash-dot-dot lines, while the closed orientation is illustrated in dash-dot lines.

Figure 8:
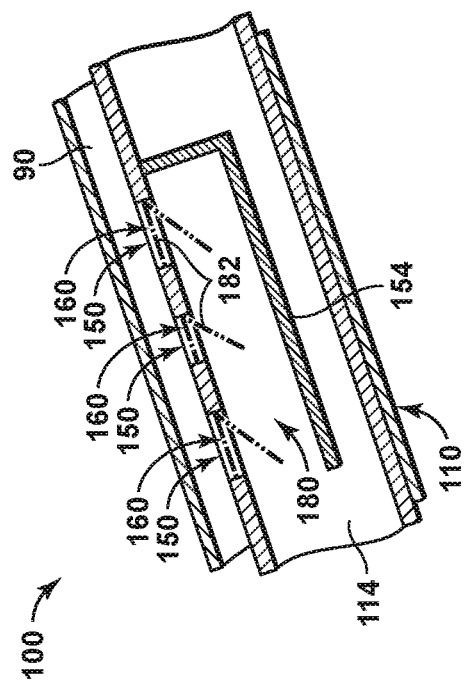
FIG. 8 is a more detailed view of a portion of the downhole gas separator of FIGS. 6-7.
Figure 9:
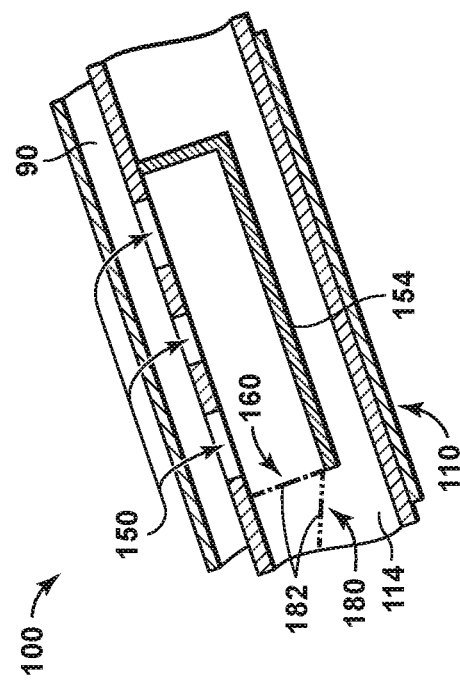
FIG. 9 is a more detailed view of a portion of the downhole gas separator of FIGS. 6-7.

As illustrated in FIGS. 8-9, flow-regulating device 160 may be configured to directly permit and/or restrict fluid flow through gas outlet port 150. As an example, and as illustrated in dash-dot-dot lines in FIG. 8, flapper 182 of flapper valve 180 of flow-regulating device 160 may be configured to extend into external region 90 and/or away from enclosed volume 114 when the flapper valve is in the open orientation. In contrast, and as illustrated in dash-dot lines in FIG. 8, flapper 182 of flapper valve 180 of flow-regulating device 160 may be configured to be aligned with and/or to seal against outer housing 110 when the flapper valve is in the closed orientation. With such a configuration, flapper valve 180 automatically and/or passively may transition to the closed orientation responsive to a pressure differential, or suction, across gas outlet port 150 that may be generated by the intake stroke of the reciprocating pump.

As another example, and as illustrated in dash-dot-dot lines in FIG. 9, flapper 182 of flapper valve 180 of flow-regulating device 160 may be configured to extend into enclosed volume 114 and/or away from external region 90 when the flapper valve is in the open orientation. In contrast, and as illustrated in dash-dot lines in FIG. 9, flapper 182 of flapper valve 180 of flow-regulating device 160 may be configured to be aligned with and/or to seal against outer housing 110 when the flapper valve is in the closed orientation.

Figure 10:
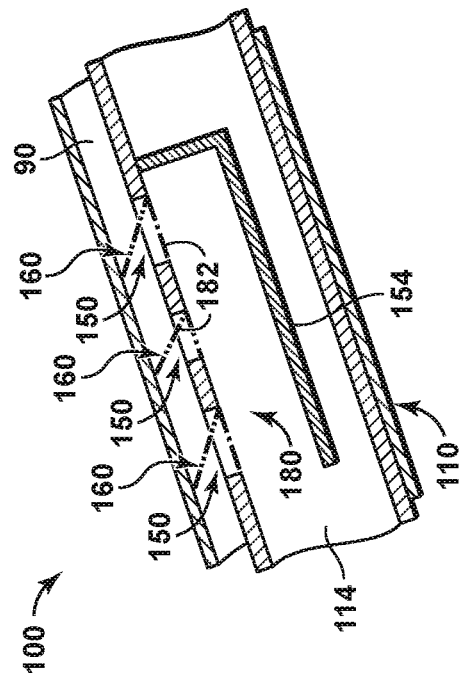
FIG. 10 is a more detailed view of a portion of the downhole gas separator of FIGS. 6-7.
Figure 11:
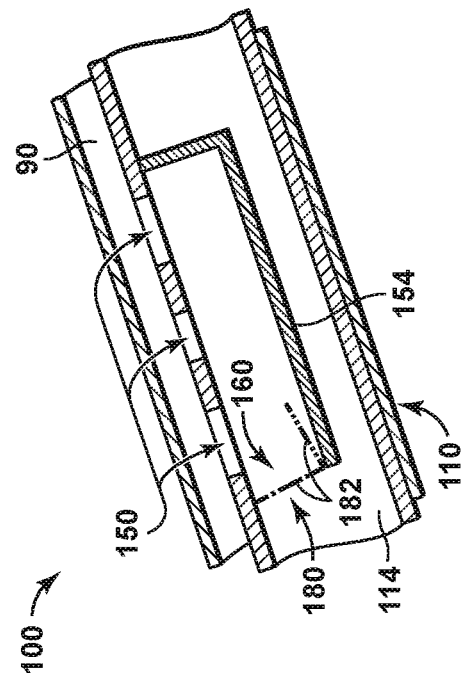
FIG. 11 is a more detailed view of a portion of the downhole gas separator of FIGS. 6-7.

As illustrated in FIGS. 10-11, flow-regulating device 160 additionally or alternatively may be positioned entirely within enclosed volume 114 and/or may be configured to indirectly permit and/or restrict fluid flow through gas outlet port 150. As an example, and as illustrated in dash-dot lines in FIGS. 10-11, flapper 182 may extend between outlet weir 154 and outer housing 110 when the flapper valve is in the closed orientation. In this configuration, flapper valve 180 may transition to the open orientation by pivoting flapper 182 toward gas outlet ports 150, as illustrated in FIG. 10, or by pivoting the flapper valve away from the gas outlet ports, as illustrated in FIG. 11. In the configuration of FIG. 10, and similar to the configuration of FIG. 8, flapper valve 180 automatically and/or passively may transition to the closed orientation responsive to a pressure differential, or suction, thereacross that may be generated by the intake stroke of the reciprocating pump.

Flow-regulating device 160 may be configured to transition between first orientation 161, as illustrated in dash-dot lines in FIGS. 6 and 8-11, and second orientation 162, as illustrated in dash-dot-dot lines in FIGS. 7 and 8-11, in any suitable manner and/or responsive to any suitable signal, stimulus, and/or motive force. As an example, flow-regulating device 160 may include and/or be a passive flow-regulating device 160 that may be configured to automatically transition between the first orientation and the second orientation responsive to fluid flow within enclosed volume 114, such as may be generated and/or initiated by the intake stroke of the reciprocating pump.

As a more specific example, flow-regulating device 160 may be biased to the second orientation and may be configured to transition to the first orientation responsive to the fluid flow within the enclosed volume. The bias may return the flow-regulating device to the second orientation and/or maintain the flow-regulating device in the second orientation, when there is no, or substantially no, fluid flow within the separator annulus, responsive to a lack of fluid flow within the separator annulus, and/or during at least a portion of the exhaust stroke of the reciprocating pump. Under these conditions, and as illustrated in FIG. 5, flow-regulating device 160 may include a biasing mechanism 164 that may be configured to provide the bias. Examples of biasing mechanism 164 are disclosed herein.

As another example, flow-regulating device 160 may include and/or be an active flow-regulating device that may be configured to transition between the first orientation and the second orientation responsive to receipt of a transition signal 166, as illustrated in FIG. 5. As a more specific example, flow-regulating device 160 may be biased to one of the first orientation and the second orientation, such as via biasing mechanism 164, and may be configured to transition to the other of the first orientation and the second orientation responsive to receipt of the transition signal. Under these conditions, the flow-regulating device may operate, against the bias, to transition to and/or to be retained within the other of the first orientation and the second orientation responsive to receipt of the transition signal. In addition, the bias may provide a motive force for return of the flow-regulating device to the one of the first orientation and the second orientation, such as when the transition signal is not provided to the flow-regulating device.

As discussed herein with reference to flow-regulating devices 160 of FIG. 2, transition signal 166 may include an electrical transition signal 170, a hydraulic transition signal 174, and/or a mechanical transition signal 178. As also discussed, separator 100 further may include a corresponding electrical conduit 168, hydraulic conduit 172, and/or mechanical linkage 176 that may be configured to convey a respective transition signal to a corresponding electrical actuator 169, hydraulic actuator 173, and/or mechanical actuator 177. Flow-regulating device 160 may include any suitable structure and/or may be formed from any suitable material and/or materials of construction, examples of which are disclosed herein.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

INDUSTRIAL APPLICABILITY

The downhole gas separators, artificial lift systems, hydrocarbon wells, and methods disclosed herein are applicable to the oil and gas industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A downhole gas separator for an artificial lift system, the separator comprising:
   an elongate outer housing including an enclosed first housing end region and a second housing end region that is spaced apart from the first housing end region, wherein the outer housing at least partially defines an enclosed volume, and further wherein the second housing end region is configured to operatively couple the separator to a reciprocating pump of the artificial lift system to provide fluid communication between a pump inlet of the reciprocating pump and the enclosed volume, wherein the reciprocating pump is configured to repeatedly perform an intake stroke and a subsequent exhaust stroke;

a fluid inlet port defined within the outer housing and configured to provide fluid communication between the enclosed volume and an external region that is external to the enclosed volume;

a gas outlet port defined within the outer housing and configured to provide fluid communication between the enclosed volume and the external region, wherein the fluid inlet port is closer to the first housing end region than the gas outlet port, and wherein the separator is configured to be positioned in a deviated wellbore, the deviated wellbore having a high side and an opposing low side, the separator positioned such that the fluid inlet port faces downward toward the low side of the wellbore and also such that the gas outlet port faces upward toward the high side of the wellbore, with respect to an interior of the outer housing; and a flow-regulating device configured to:

(i) restrict fluid flow through the gas outlet port during at least a portion of each intake stroke; and (ii) permit fluid flow through the gas outlet port during at least a portion of each exhaust stroke, wherein the separator is configured such that fluid flowing from the fluid inlet port in the outer housing flows past the gas outlet port and to the pump inlet without reversing direction of fluid flow within the enclosed volume, wherein at least a portion of gas within the fluid flowing within the enclosed volume is separated from the fluid flowing within the enclosed volume, wherein the separated gas flows along a high side of the enclosed volume to the gas outlet port while the remainder of the separated fluid flows to the pump inlet along a low side of the enclosed volume to the pump inlet without reversing direction of the fluid flow within the enclosed volume.

2. The separator of claim 1, wherein the flow-regulating device is a flapper valve that includes a flapper configured to selectively transition between a closed orientation, in which the flapper valve restricts the fluid flow through the gas outlet port, and an open orientation, in which the flapper valve permits the fluid flow through the gas outlet port.

3. The separator of claim 2, wherein the flapper is configured to extend into the enclosed volume when the flapper valve is in the open orientation.

4. The separator of claim 2, wherein the flapper is configured to extend into the external region when the flapper valve is in the open orientation.

5. The separator of claim 1, wherein the flow-regulating device includes a first orientation, in which the flow-regulating device restricts fluid flow through the gas outlet port, and a second orientation, in which the flow-regulating device permits fluid flow through the gas outlet port.

6. The separator of claim 5, wherein the flow-regulating device is a passive flow-regulating device configured to automatically transition between the first orientation and the second orientation responsive to a fluid flow within the enclosed volume that is initiated by the reciprocating pump, and further wherein the flow-regulating device is biased to the second orientation and is configured to transition to the first orientation responsive to the fluid flow within the enclosed volume that is initiated by the reciprocating pump, and further wherein the flow-regulating device includes a biasing mechanism configured to provide the bias.

7. An artificial lift system for a hydrocarbon well, the artificial lift system comprising:

a reciprocating pump;

a drive assembly for the reciprocating pump wherein the drive assembly includes at least one of an electric motor, a hydraulic pump, and an internal combustion engine; and the separator of claim 1.

* * * * *